(12) United States Patent
Wildeman et al.

(10) Patent No.: US 9,509,819 B2
(45) Date of Patent: Nov. 29, 2016

(54) MMTEL NETWORK CALL LOGGING

(75) Inventors: Mattias Wildeman, Stockholm (SE);
Jan Gjärdman, Farsta (SE); Jan Lidin,
Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 144 days.

(21) Appl. No.: 14/125,484

(22) PCT Filed: Jun. 22, 2011

(86) PCT No.: PCT/EP2011/060499
§ 371 (c)(1),
(2), (4) Date: Dec. 11, 2013

(87) PCT Pub. No.: WO2012/175131
PCT Pub. Date: Dec. 27, 2012

(65) Prior Publication Data
US 2014/0105073 A1   Apr. 17, 2014

(51) Int. Cl.
| | | |
|---|---|---|
| *H04L 12/56* | (2006.01) | |
| *H04M 1/56* | (2006.01) | |
| *H04L 29/08* | (2006.01) | |
| *H04L 29/06* | (2006.01) | |
| *H04W 24/08* | (2009.01) | |

(52) U.S. Cl.
CPC ............ *H04M 1/56* (2013.01); *H04L 65/40* (2013.01); *H04L 67/22* (2013.01); *H04L 67/306* (2013.01); *H04W 24/08* (2013.01)

(58) Field of Classification Search
CPC . H04M 2250/60; H04W 40/16; H04W 8/18; H04W 8/20; H04B 7/1856
See application file for complete search history.

(56) References Cited

U.S. PATENT DOCUMENTS

| | | | | |
|---|---|---|---|---|
| 2005/0059384 A1* | 3/2005 | Kuusinen | ............ | H04M 1/575 455/414.1 |
| 2006/0105766 A1* | 5/2006 | Azada et al. | ............... | 455/432.1 |
| 2007/0198672 A1* | 8/2007 | Pak et al. | ....................... | 709/223 |
| 2007/0206568 A1* | 9/2007 | Silver et al. | ................... | 370/352 |
| 2009/0093249 A1* | 4/2009 | Zhu et al. | ..................... | 455/433 |
| 2010/0093284 A1* | 4/2010 | Terrero Diaz-Chiron et al. | ........................ | 455/67.11 |
| 2011/0258300 A1* | 10/2011 | Hao et al. | ..................... | 709/221 |
| 2012/0100830 A1* | 4/2012 | Barber et al. | ................ | 455/410 |

FOREIGN PATENT DOCUMENTS

WO    WO 2007/014751 A1   2/2007

OTHER PUBLICATIONS

International Search Report, PCT Application No. PCT/EP2011/060499, Mar. 1, 2012.
Written Opinion of the International Searching Authority, PCT Application No. PCT/EP2011/060499, Mar. 1, 2012.

* cited by examiner

*Primary Examiner* — Alvin Zhu
(74) *Attorney, Agent, or Firm* — Myers Bigel, P.A.

(57) ABSTRACT

A data handling unit and a method therein for handling information regarding call events in a Multimedia Telephony Service, MMTel, network are provided for enabling call logging, wherein a SIP Message comprising call log information referring to a call event is generated for the call event and sent to a storage server. The method comprises receiving information on at least one call event, generating a SIP Message comprising call log information referring to the call event, and sending the generated SIP Message towards a storage server.

21 Claims, 5 Drawing Sheets

MMTEL NETWORK CALL LOGGING

CROSS REFERENCE TO RELATED APPLICATION

This application is a 35 U.S.C. §371 national stage application of PCT International Application No. PCT/EP2011/060499, filed on 22 Jun. 2011, the disclosure and content of which is incorporated by reference herein in its entirety. The above-referenced PCT International Application was published in the English language as International Publication No. WO 2012/175131 A1 on 27 Dec. 2012.

TECHNICAL FIELD

Embodiments herein relate generally to logging of call events in a MMTel communication network, and in particular to logging of call events in a storage server.

BACKGROUND

There is a demand for a call log in Multimedia Telephony Service (MMTel) communication networks which is accessible from user devices independent of the device used for communication, and which also comprise information about call activities when no device was registered in the network.

Some existing solutions are client centric, i.e. the mobile phone or IP Multimedia Subsystem (IMS) client is responsible for storing the data and then presenting a consolidated view to a user of the phone. Some existing solutions are network centric but not consolidated, for example Short Message Service (SMS), Multimedia Messaging Service (MMS), Session Initiation Protocol (SIP) MESSAGE message are stored in one network log and call data is stored in a different network log. Hereinafter, when the term "SIP Message" is used, it is intended a SIP MESSAGE message, i.e. a SIP message called MESSAGE.

The client centric solutions have several drawbacks, for example, when a phone is not connected to the network because it is turned off or is out of range, call events that occur from other devices trying to reach the not connected phone will not be logged in the phone, e.g. missed calls. If multiple clients are connected to the same identity, e.g. phone number or SIP Uniform Resource Identifier (URI), mediation issues occur. For example, if a message is deleted on one device, the same message may still be present on other devices, communication initiated on one device is not visible at other devices and calls answered on one device may be registered as missed calls on other devices. Further, if the phone is lost, then the log information is also lost, and the log information may further potentially be read by an outside party.

SUMMARY

It is an object of the exemplifying embodiments to address at least some of the problems outlined above. In particular, it is an object of the exemplifying embodiments to provide a data handling unit and a method therein for handling information regarding call events in a Multimedia Telephony Service, MMTel, network for enabling call logging, wherein a SIP Message comprising call log information referring to a call event is generated for the call event and sent to a storage server. These objects and others may be obtained by providing a data handling unit and a method in a data handling unit according to the independent claims attached below.

According to an aspect a method in a data handling unit is provided for handling information regarding call events in a Multimedia Telephony Service, MMTel, network for enabling call logging. The method comprises receiving information on at least one call event, generating a SIP Message comprising call log information referring to the call event, and sending the generated SIP Message towards a storage server. In this way, the storage server is enabled to store call log information regarding the call event.

According to an aspect, a data handling in a Multimedia Telephony Service, MMTel, network adapted for handling information regarding calls is provided. The data handling unit is configured to receive information on at least one call event, to generate a SIP Message comprising call log information referring to the call event, and to send the generated SIP Message towards a storage server. In this way, the storage server is enabled to store call log information regarding the call event.

The data handling unit and the method therein have several advantages. By storing call log information for call events on the storage server, a user may access his/her call log information and obtain information regarding different call events, e.g. missed calls, the reason why they were missed, to which device or terminal the call was placed and so on. Further, call events which occur when a phone is not connected to a network will be logged. In case one telephone number is valid for multiple devices, the logging of call events regarding the telephone number will be logged. Hence, any deletion of local call information on a specific device will not incur deletion on the storage server so that the information is not lost. Still further, should a phone be lost, the call event log information is not lost. Yet an advantage is that the stored call information is easily accessible from the storage server at any later stage.

BRIEF DESCRIPTION OF DRAWINGS

Embodiments will now be described in more detail in relation to the accompanying drawings, in which.

DETAILED DESCRIPTION

Briefly described, exemplifying embodiments of a data handling unit and a method therein are provided for handling information regarding call events in a Multimedia Telephony Service, MMTel, network for enabling call logging. The logging of call events are performed in such a way that a SIP Message is generated for a call event and sent to a storage server. In this description, a call event is any of a missed call, a placed call, a received call, a diverted call, a barred call, and so on.

An exemplifying embodiment of such a method in a data handling unit for handling information regarding call events in a Multimedia Telephony Service, MMTel, network for enabling call logging will now be described with reference to the flowchart in FIG. 1.

Figure 1:
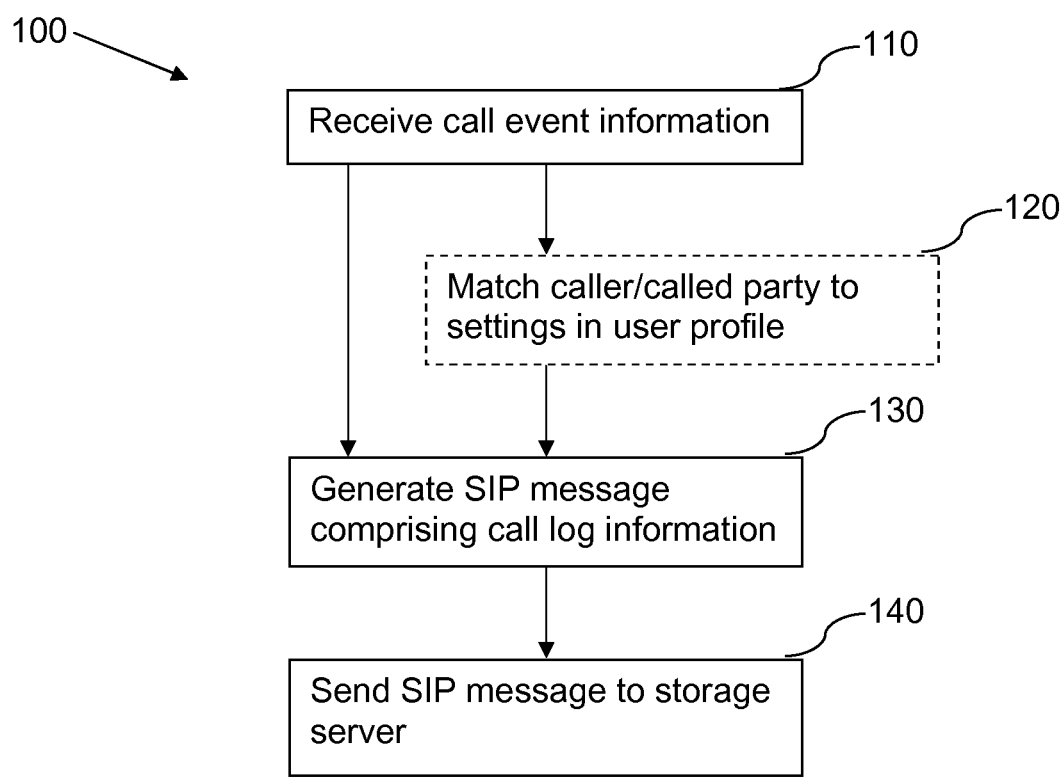
FIG. 1 is a flowchart of an exemplifying embodiment of a method in a data handling unit.

FIG. 1 illustrates the method comprising receiving 110 information on at least one call event, generating 130 a SIP Message comprising call log information referring to the call event, and sending 140 the generated SIP Message towards a storage server. In this way, the storage server is enabled to store call log information regarding the call event.

When a first user A makes use of a terminal, e.g. a phone, to place a call to a second user B, the actions taken by user A generates call event information, both with regards to user A and user B. In case the call is successful, for user A, the generated call information comprises e.g. successful placed call, call duration, identity of called user, and so on. For user B, in case the call is successful, the generated call information comprises e.g. successful received call, call duration, identity of calling user, and so on. In case the call is not successful, for user A, the generated call information comprises e.g. un-successful placed call, identity of called user and so on. For user B, in case the call is un-successful, the generated call information comprises e.g. missed call, missed call while busy on phone, missed call while out-of-coverage or missed call while phone turned off. Of course other call information may be generated and the examples above are merely examples. It shall be noted that the call information is generated with regards to a user identity, meaning that two separate pieces of call information are generated, one call information for user A and one call information for user B.

The generated call information is received 110 in the data handling unit. Then a SIP Message comprising call log information referring to the call event is generated 130 and sent 140 to a storage server. In this way, call log information is generated and then stored in the storage server. The stored call log information for a specific user may be accessed by the user, using one of his communication devices to obtain the call log information relating to him/her.

The generated call log information in this example for user A and B may be generated separately or together. In one example, the received call log information comprises call event information regarding both users. In another example, two separate call event information are received, one call event information for user A and one call event information for user B.

The exemplified embodiment has several advantages. By storing call log information for call events on the storage server, a user may access his/her call log information and obtain information regarding different call events, e.g. missed calls, the reason why they were missed, to which device or terminal the call was placed and so on. Further, call events which occur when a phone is not connected to a network will be logged. In case one telephone number is valid for multiple devices, the logging of call events regarding the telephone number will be logged. Hence, any deletion of local call information on a specific device will not incur deletion on the storage server so that the information is not lost. Still further, should a phone be lost, the call event log information is not lost. Yet an advantage is that the stored call information is easily accessible from the storage server at any later stage.

According to an embodiment, the method further comprises matching 120 a caller or called party to settings in a user profile for the caller or called party, using the received information before generating the SIP Message and generating the SIP Message comprising call log information referring to the call event, only if settings in the user profile for the caller or called party indicates that call event information is to be saved.

In this embodiment, the data handling unit receives 110 information on a call event comprising e.g. call event type and the identity of the user for who the call event is related. For example, if a user A tries to place a call to a user B and the call attempt is un-successful, then the received 110 call event information for user B may comprise e.g. missed call from user A while busy on phone. User B has a user profile which in an example is stored in an MMTel Application Server, and the user profile indicates whether or not call event information is to be saved. Alternatively, the user profile is stored in a Home Subscriber Server (HSS) and is then fetched by the MMTel Application Server when a call event is executed. If the user profile indicates that call event information is not to be saved, then the data handling unit may simply discard the received 110 information on at least one call event. On the other hand, if the user profile indicates that call event information is to be saved, the method comprises generating 130 a SIP Message comprising call log information referring to the call event, and sending 140 the generated SIP Message towards a storage server as described above.

In an alternative embodiment, this functionality of matching 120 a caller or called party to settings in a user profile for the caller or called party is performed by the MMTel Application Server. This means, that the data handling unit will generate 130 a SIP Message comprising call log information referring to the call event and send 140 the generated SIP Message towards the storage server. This means that if call event information is received 110, it has already been ascertained, by the MMTel Application Server, that a SIP Message is to be generated and sent to the storage server. This is illustrated in FIG. 1 by the step 120 being in a dotted rectangle as this functionality may be implemented in the data handling unit by the method performed therein, or in e.g. the MMTel Application Server.

According to yet an embodiment, the information on at least one call event is received 110 from an MMTel Application Server.

According to still an embodiment, the information on at least one call event is received 110 from a Mobile Switching Centre, MSC.

According to the two embodiments above, it is the entity (MMTel Application Server or the MSC) which either receives the call attempt request from user A, i.e. originating side, and/or the entity (MMTel Application Server or the MSC) to which user B, i.e. terminating side, is connected or associated that generates call event information. In other words, there is always an MMTel AS or a MSC handling originating and terminating call events for each user involved in the call event, and this is normally the entity which generates the call event information for all users involved in the call event. For some special services like conferencing there may be a specific AS taking care of this service and it would then also be able to generate call event information for the users involved in the conference call, i.e. the call event.

According to an embodiment, the call log information is at least one of a time stamp, payload, originating party, destination party, history, Session Description Protocol, SDP, and the like.

According to still an embodiment, body of the SIP Message comprises information on the nature of the call event in plaintext.

This means that the SIP Message comprises plaintext such as for example "Missed call", "Received call—duration 1:43", "Missed call dd/mm/yy/time while phone off". The plaintext is the text which will be shown to a user when he/she accesses the stored call log information on the storage server.

According to an embodiment, a user's MMTel Application Server profile comprises information defining a plaintext language to be used.

The MMTel Application Server profile comprises, in this embodiment, information defining the language to be used with regards to the user. The user may at some point in time have been given the option to indicate which language he/she prefers, for example English, and then the use of English is defined in the MMTel Application Server profile of the user.

The user profile, from which either the MMTel Application Server or the data handling unit determines whether call event information, is to be saved or not is in an example dynamic such that a user may at any time activate or de-activate the service of having call event information stored. In yet an example, this is performed via supplementary service codes, a Ut interface or a web Interface. The Ut interface is defined in 3GPP TS 24.623 "Extensible Markup Language (XML) Configuration Access Protocol (XCAP) over the Ut interface for Manipulating Supplementary Services".

A user may use a client, which may be an application on a phone, a web browser or the like, to access the storage server and retrieve call event information. The call event information may be retrieved together with all incoming messages, voicemails etc. of the user. The storage server supports in an example sorting functions such that the user may retrieve only voicemails, only messages from a certain caller and so on. In an example, the storage server delegates the sorting to the client of the user and simply returns all messages relating to the account of the user. During the retrieval, the client of the user uses, in an example, any supported protocol, e.g. Internet Message Access Protocol (IMAP), XML Configuration Access Protocol (XCAP) or Structured Query Language (SQL).

Embodiments herein also relate to a data handling unit in a Multimedia Telephony Service, MMTel, network for handling information regarding calls. Such a data handling unit will now be described with reference to the block diagram in FIG. 2a.

The data handling unit has the same objects and advantages as the method therein. Consequently, the data handling unit will be described in brief to avoid unnecessary repetition.

The data handling unit 200 in a Multimedia Telephony Service, MMTel, network adapted for handling information regarding calls is configured to receive information on at least one call event, to generate a SIP Message comprising call log information referring to the call event, and to send the generated SIP Message towards a storage server 270. In this way, the storage server 270 is enabled to store call log information regarding the call event.

According to an embodiment, the data handling unit 200 is further adapted to match a caller or called party to settings in a user profile for the caller or called party using the received information before generating the SIP Message. The data handling unit is also adapted to generate the SIP Message comprising call log information referring to the call event, only if settings in the user profile for the caller or called party indicate that call event information is to be saved.

According to still an embodiment, the information on at least one call event is received from an MMTel Application Server 260.

According to yet an embodiment, the information on at least one call event is received from a Mobile Switching Centre, MSC.

According to a further embodiment, the call log information is at least one of a time stamp, payload, originating party, destination party, history, Session Description Protocol, SDP, and the like.

According to still an embodiment, a body of the SIP Message comprises information on the nature of the call event in plaintext.

According to yet an embodiment, a user's MMTel Application Server profile comprises information defining a plaintext language to be used.

In a further embodiment, the data handling unit is comprised in an MMTel Application Server 260.

In this embodiment, the data handling unit 200 is a part of the MMTel Application Server 260. This means that the data handling unit 200 is an integrated part of the MMTel Application Server 260. See FIG. 2b.

According to an embodiment, the data handling unit 200 is connected to an MMTel Application Server 260. See FIG. 2c.

Figure 2A:
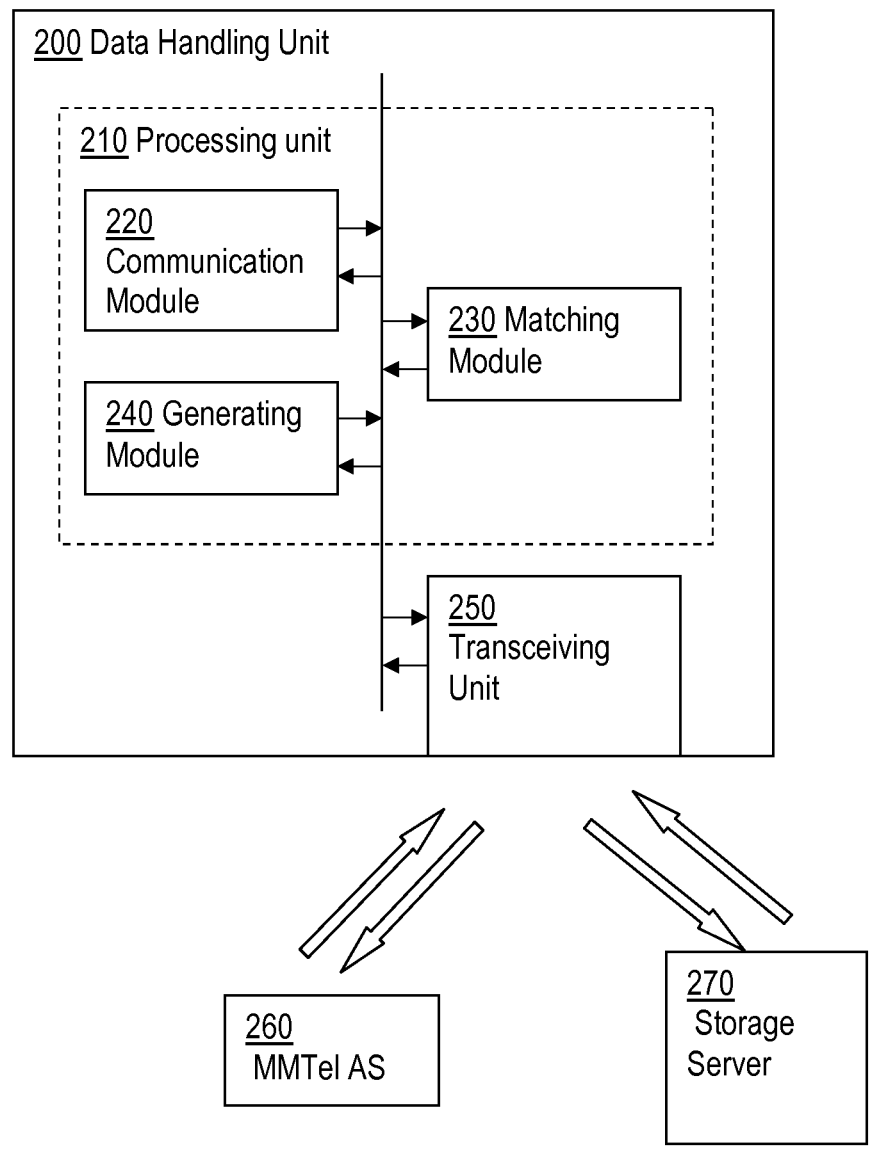
FIG. 2a is a block diagram schematically illustrating an exemplifying embodiment of a data handling unit.
Figure 2B:
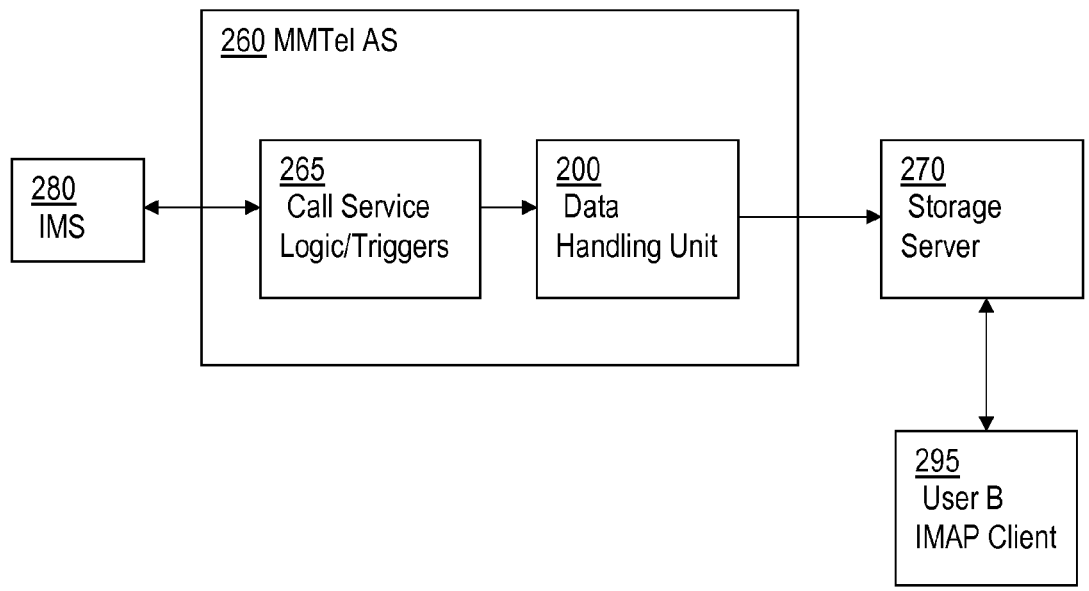
FIG. 2b is a block diagram of an exemplifying embodiment of an MMTel network.

FIG. 2b is a block diagram of an exemplifying embodiment of an MMTel network.

The exemplifying embodiment illustrated in FIG. 2b, shows the data handling unit 200 being incorporated within a MMTel Application Server 260. The MMTel Application Server 260 also comprises a Call Service Logic Unit 265, which is configured to send, to the data handling unit 200, information on at least one call event. This corresponds to step 110 in FIG. 1. Further illustrated in FIG. 2b is that the data handling unit 200 sends a generated SIP Message towards a storage server 270. This corresponds to step 140 in FIG. 1. FIG. 2b further illustrates a user B accessing the storage server 270 by using an IMAP client 295 as has been described above. It shall be noted that other clients may be used by a user to access the storage server 270. In an example of this illustrated embodiment, the Call Service Logic Unit 265 is configured to match a caller or called party to settings in a user profile for the caller or called party, and to send the information on at least one call event to the data handling unit 200, only if settings in a user profile for the caller or called party indicates that call event information is to be saved. In another example, this functionality is implemented into the data handling unit 200 as has been described above with regards to step 120 in FIG. 1.

Figure 2C:
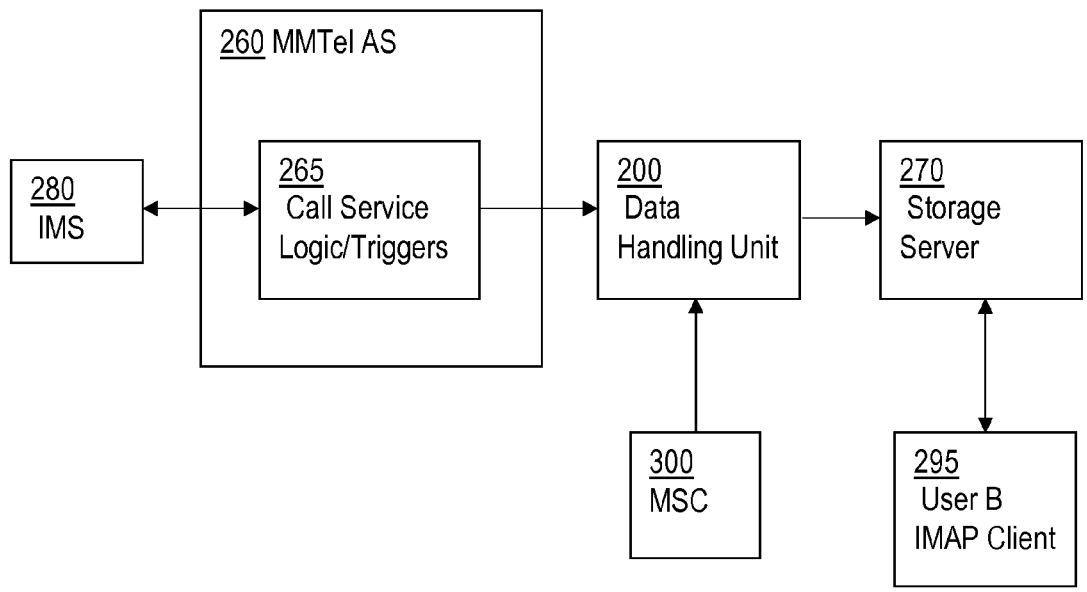
FIG. 2c is a block diagram of yet an exemplifying embodiment of an MMTel network

FIG. 2c is a block diagram of yet an exemplifying embodiment of an MMTel network.

The exemplifying embodiment illustrated in FIG. 2c, shows the data handling unit 200 being a separate unit connected to the MMTel Application Server 260. The functionalities of the units in FIG. 2c are the same as in FIG. 2b. FIG. 2c also illustrates a Mobile Switching Centre, MSC, 300 being configured to send, to the data handling unit 200, information on at least one call event. This corresponds to step 110 in FIG. 1.

Figure 2D:
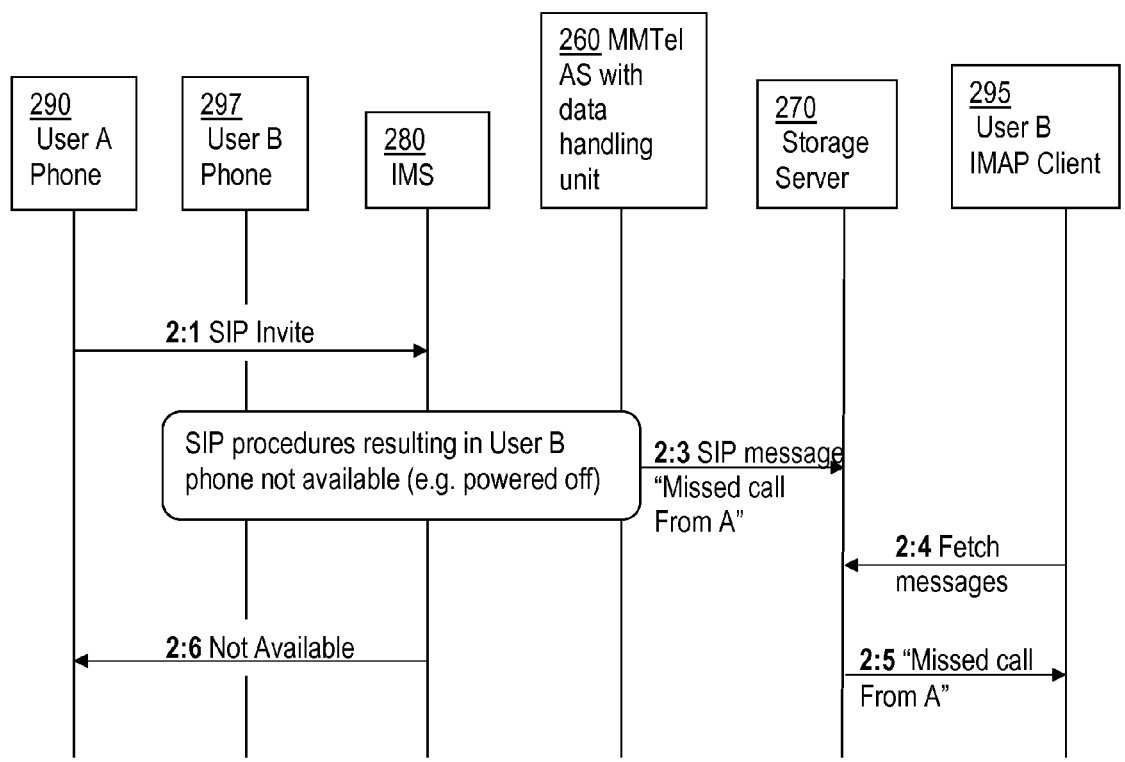
FIG. 2d is a schematic signalling diagram of an exemplifying embodiment of a method in a data handling unit.

FIG. 2d is a schematic signalling diagram of an exemplifying embodiment of a method in a data handling unit. In this embodiment, the data handling unit is incorporated into the MMTel Application Server 260 as illustrated in FIG. 2b. The signalling diagram illustrates the storing of call event information regarding user B.

In FIG. 2d, a user A makes use of his/her phone 290 to place a call of some kind to a phone 297 of user B. This is illustrated in FIG. 2d by the user A phone 290 sending a 2:1 SIP invite message to IMS 280. The different procedures taking place in IMS 280 is not described in detail since they are known in the art. However, the different procedures result in determining that the user B phone 297 is not available. The data handling unit within the MMTel Application Server 260 then generates a SIP Message comprising call log information referring to the call event, corresponding to step 130 of FIG. 1, and sends 2:3 the SIP Message with information about a missed call from user A to the storage server 270. Also IMS 280 informs user A that user B was not available by sending 2:6 a message to user A. The user B may later use a device 295 comprising a client for accessing the storage server 270 to retrieve or fetch call log information. This is illustrated in FIG. 2d by the user B IMAP client 295 fetching 2:4 messages from the storage server 270 and receiving 2:5 information about the missed call from user A.

Figure 2E:
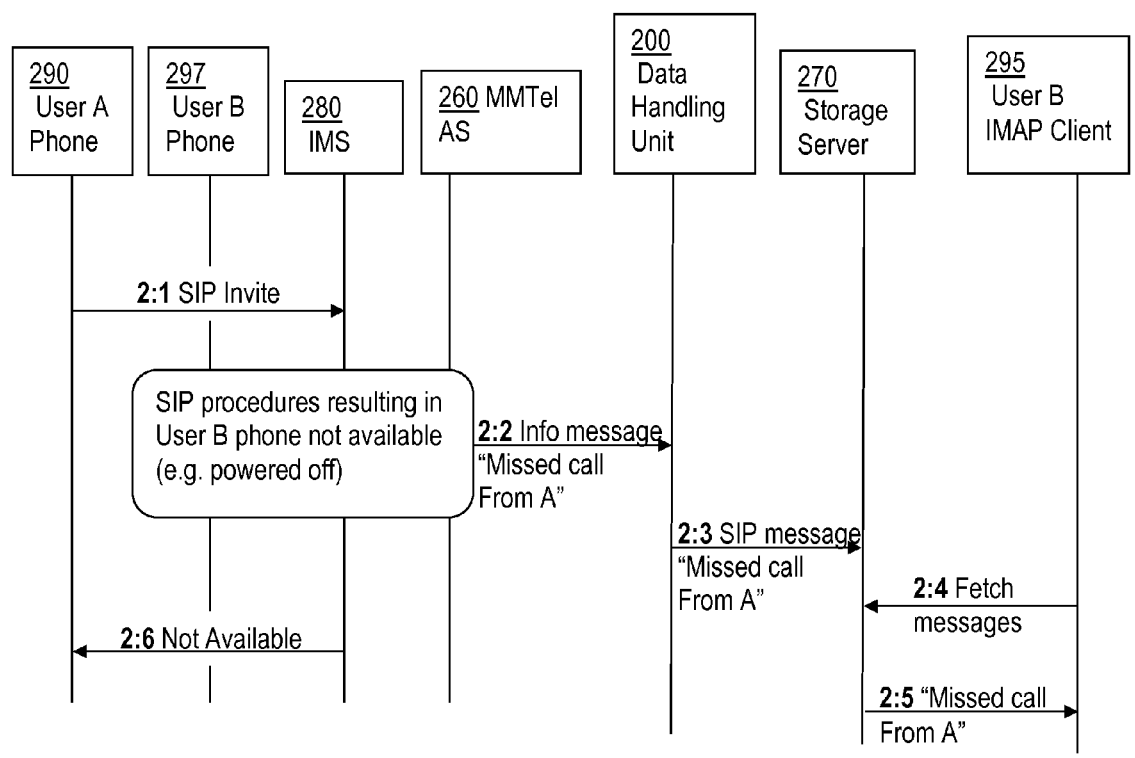
FIG. 2e is a schematic signalling diagram of yet an exemplifying embodiment of a method in a data handling unit.

FIG. 2e is a schematic signalling diagram of yet an exemplifying embodiment of a method in a data handling unit. In this embodiment, the data handling unit is a separate unit 200 connected to the MMTel Application Server 260 as illustrated in FIG. 2c.

The signalling illustrated in FIG. 2e differs from the signalling illustrated in FIG. 2d in that the MMTel Application Server 260 sends 2:2 an information message to the data handling unit 200, the information message comprising information about a missed call from user A. This is illustrated as a separate signalling step since the data handling unit 200 is a "standalone" unit which is connected to the MMTel Application Server 260. Then the data handling unit 200 generates and sends a SIP Message comprising call event information as having been described above.

It should be noted that FIG. 2a merely illustrates various functional units and modules in the data handling unit in a logical sense. The functions in practice may be implemented using any suitable software and hardware means/circuits etc. Thus, the embodiments are generally not limited to the shown structures of the data handling unit and the functional units and modules. Hence, the previously described exemplary embodiments may be realised in many ways. For example, one embodiment includes a computer-readable medium having instructions stored thereon that are executable by the data handling unit, e.g. the processing unit 210 therein, for executing the method. The instructions executable by the computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a data handling unit for handling information regarding call events in a Multimedia Telephony Service (MMTel) network for enabling call logging, the method comprising:
    receiving information on at least one call event, associated with a user of the MMTel network, upon completion of the at least one call event, wherein the at least one call event is one of a missed call, a placed call, a received call, a diverted call, or a barred call,
    matching the user to settings in a user profile for the user associated with the received information, wherein the user profile contains preferences for storing call event information,
    responsive to completion of the at least one call event and independent of whether a user equipment of the user is connected to the MMTel network, generating a Session Initiation Protocol (SIP) Message comprising call log information referring to the at least one call event if the preferences in the user profile for the user indicate that the received information of the at least one call event is to be saved, and
    sending said generated SIP Message towards a storage server, thereby enabling said storage server to store call log information regarding the at least one call event.

2. The method according to claim 1, wherein said information on at least one call event is received from a MMTel Application Server.

3. The method according to claim 1, wherein said information on at least one call event is received from a Mobile Switching Centre (MSC).

4. The method according to claim 1, wherein call log information is at least one of a time stamp, payload, originating party, destination party, or history.

5. The method according to claim 1, wherein a body of said SIP Message comprises information on the nature of the call event in plaintext.

6. The method according to claim 5, wherein a user's MMTel Application Server profile comprises information defining a plaintext language to be used in the SIP Message.

7. A data handling unit in a Multimedia Telephony Service (MMTel) network for handling information regarding calls, the data handling unit being adapted to:
    receive information on at least one call event, associated with a user of the MMTel network, upon completion of the at least one call event, wherein the at least one call event is one of a missed call, a placed call, a received call, a diverted call, or a barred call,
    match the user to settings in a user profile for the user associated with the received information, wherein the user profile contains preferences for storing call event information,
    responsive to completion of the at least one call event and independent of whether a user equipment of the user is connected to the MMTel network, generate a Session Initiation Protocol (SIP) Message comprising call log information referring to the at least one call event if the preferences in the user profile for the user indicate that the received information of the at least one call event is to be saved, and to
    send said generated SIP Message towards a storage server, thereby enabling said storage server to store call log information regarding the at least one call event.

8. The data handling unit according to claim 7, wherein said information on at least one call event is received from a MMTel Application Server.

9. The data handling unit according to claim 7, wherein said information on at least one call event is received from a Mobile Switching Centre (MSC).

10. The data handling unit according to claim 7, wherein call log information is at least one of a time stamp, payload, originating party, destination party, or history.

11. The data handling unit according to claim 7, wherein a body of said SIP Message comprises information on the nature of the call event in plaintext.

12. The data handling unit according to claim 11, wherein a user's MMTel Application Server profile comprises information defining a plaintext language to be used in the SIP Message.

13. The data handling unit according to claim 7, wherein said data handling unit is comprised in a MMTel Application Server.

14. The data handling unit according to claim 7, wherein said data handling unit is connected to a MMTel Application Server.

15. A MMTel Application Server comprising a data handling unit according to claim 7.

16. An application server of a Multimedia Telephony Service (MMTel) network, the application server configured to:
 determine that a call event has occurred between a first user of the MMTel network and a second user of the MMTel network, wherein the call event is one of a missed call, a placed call, a received call, a diverted call, or a barred call,
 responsive to the call event, identify a first user logging profile for the first user, wherein the first user logging profile indicates preferences for saving information related to the call event for the first user,
 further responsive to the call event, identify a second user logging profile for the second user, wherein the second user logging profile indicates preferences for saving information related to the call event for the second user, and wherein the second user logging profile is different from the first user logging profile,
 responsive to determining that the first user logging profile indicates a preference of the first user for the information related to the call event for the first user to be saved, perform the steps of:
  generate a first Session Initiation Protocol (SIP) Message containing the information related to the call event for the first user,
  format the first SIP Message in a format indicated by the first user logging profile, and
  send the first SIP Message to a storage server to store the information related to the call event for the first user,
 responsive to determining that the second user logging profile indicates a preference of the second user for the information related to the call event for the second user to be saved, perform the steps of:
  generate a second SIP Message containing the information related to the call event for the second user,
  format the second SIP Message in a format indicated by the second user logging profile, wherein the second SIP Message is formatted differently than the first SIP Message, and
  send the second SIP Message to the storage server to store the information related to the call event for the second user.

17. The application server of claim 16, wherein generating the first SIP Message containing information related to the call event for the first user occurs when the first user is not connected to the MMTel network.

18. The application server of claim 16, wherein determining that the call event has occurred between the first user of the MMTel network and the second user of the MMTel network comprises receiving generated call log information for the call event between the first user and the second user.

19. The application server of claim 18, wherein receiving the generated call log information comprises receiving a single call event information for both the first user and the second user.

20. The application server of claim 18, wherein receiving the generated call log information comprises receiving a separate call event information for the first user and a separate call event information for the second user.

21. The application server of claim 16, wherein the first user logging profile comprises information defining a plaintext language to be used in the first SIP Message.

* * * * *